United States Patent [19]
Saurer

[11] 3,836,229
[45] Sept. 17, 1974

[54] ELECTRO-OPTICAL DISPLAY DEVICE
[75] Inventor: Eric Saurer, Hauterive, Switzerland
[73] Assignee: Ebauches S.A., Neuchatel, Switzerland
[22] Filed: Jan. 8, 1973
[21] Appl. No.: 321,706

[30] Foreign Application Priority Data
Jan. 12, 1972 Switzerland............................ 422/72

[52] U.S. Cl. ................................................. 350/160
[51] Int. Cl. ............................................. G08b 5/36
[58] Field of Search...................... 350/160, 311, 312; 340/336

[56] References Cited
UNITED STATES PATENTS
3,578,843  5/1971  Castellion ............................ 350/160
3,708,220  1/1973  Meyers et al. ........................ 350/160
3,725,910  4/1973  McNaney............................... 350/160

Primary Examiner—William L. Sikes
Attorney, Agent, or Firm—Silverman & Cass

[57] ABSTRACT

An electro-optical display device for a timepiece in which the device is provided with a shield of electrically insulating transparent material. The shield is applied to a conductive substratum having a design thereon such that the shield covers the marginal portions of the design so as to prevent an excessive density of current on the edges of an electrochromic layer overlying the substratum to prevent erosion of the edges.

5 Claims, 5 Drawing Figures

PATENTED SEP 17 1974  3,836,229

ELECTRO-OPTICAL DISPLAY DEVICE

The present invention has for object an electrooptical display device, especially for a timepiece, comprising, superposed on each other, the following elements:

a. a transparent conductive substratum,
b. an electrochromic layer applied on the said substratum, these two first elements constituting together a first electrode,
c. a counter-electrode maintained at a distance from the said first electrode, and
d. an electrolyte located in the space situated between the two electrodes,
the said electrochromic layer constituting, in plan view, a design or pattern.

It is understood by "electrochromic layer" a layer made of a material the characteristic of absorption of the electromagnetic radiations of which is altered, in most of cases, even at room temperature, by the influence of an electric field. Such materials, for instance, can show a weak absorption of the visible radiations in the absence of an electric field and be fast transparent at this time; however, when they are submitted to an electric field, they absorb for instance the red extremity of the spectrum, so that they take a blue colour. Similar effects can be observed in other portions of the spectrum of the electromagnetic radiations, as well unvisible as visible.

When an electrochromic layer is deposited on a transparent conductive substratum, one can vary the optical density of this layer while applying an electric field between the electrode which is thus constituted and another electrode, or counter-electrode, the space situated between the two electrodes being filled with an electrolyte, the whole constituting a kind of "sandwich." The application of a difference of potential to the terminals of the two electrodes permits to have the electrochromic layer passing from the state "clear" or uncoloured to the dark or coloured state.

Such a display device is known per se. Especially, it is known to arrange the electrochromic layer in such a way that it constitutes a design or pattern. Several of these designs can constitute, together, a numeral. One knows for instance a display device comprising seven segments in which all the arabic numerals from 0 to 9 can be represented by a suitable selection of these segments. When the segments are alternatively coloured or uncoloured, the numerals appear or disappear successively; one calls "cycle" the succession of a colouration and of a discolouration.

Now, it has been ascertained that the edges of these segments are submitted to an excessive density of current and are submitted, for this reason, to an erosion in the course of time. Consequently, the known devices operate satisfyingly during a certain number of cycles, for instance of the order of some hundred of thousands of cycles, but gradually the outlines of the segments become indistinct and their wideness decreases, so that the observation is not reliable.

The present invention permits to eliminate this drawback. To this effect, the display device according to the invention is provided with a shield made of transparent material and electrically insulating, the said shield being applied on the substratum and covering the marginal portions of the design or pattern, in such a way as to prevent an excessive density of current on the edges of the electrochromic layer and, consequently, an erosion of these edges.

The drawings show a known display device and, by way of example, one embodiment of the display device according to the invention.

Figure 1:
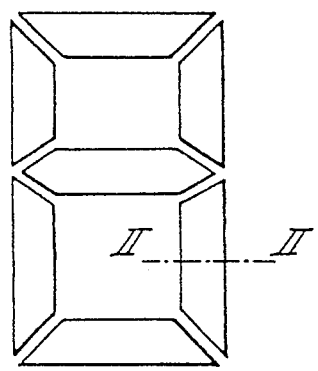
FIG. 1 is a view of a numeral constituted by seven segments, in its initial state.
Figure 2:
FIG. 2 is a sectional view along line II—II of FIG. 1, at an enlarged scale.

It can be seen, in FIG. 1, a numeral constituted with seven segments, in its initial condition, that is to say when coming from the manufacture. While colouring some segments, one can make to appear anyone of the numerals 0 to 9. The sectional view of FIG. 2 shows that the edges of the electrochromic layer are sharp.

Figure 3:
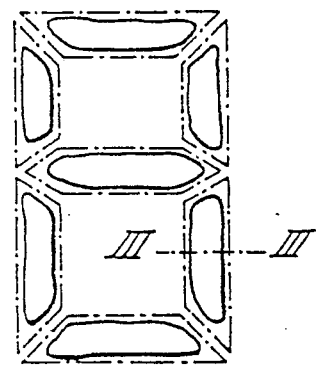
FIG. 3 is a view similar to this one of FIG. 1, but after a rather big number of cycles.
Figure 4:
FIG. 4 is a sectional view from line IV—IV of FIG. 3, at an enlarged scale.

When the device has operated during a time, and has, for instance, effected some hundred of thousands of cycles, an erosion of the edges takes place due to the density of current which acts on these edges. Consequently, the outlines of the segments become indistinct, as shown in FIG. 3, so that the observation becomes unprecise.

Figure 5:
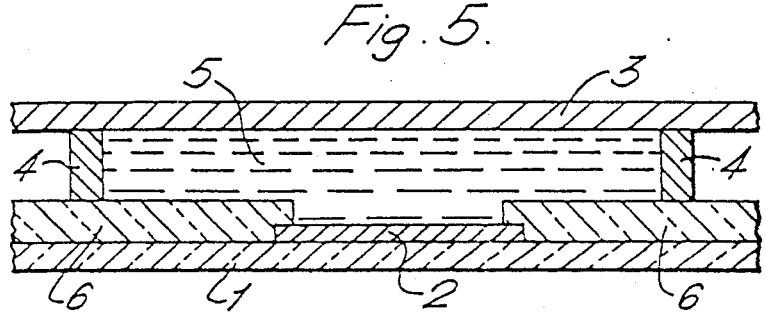
FIG. 5 is a sectional view of the said embodiment of the present display device.

The display device represented in FIG. 5 comprises a transparent conductive substatum 1, an electrochromic layer 2 applied on the said substratum, these two elements constituting together a first electrode, a counter-electrode 3 maintained at distance from the electrode 1,2 by distance pieces 4, and a liquid electrolyte 5 arranged in the space situated between the two electrodes 3 and 1,2. The substratum 1 is made, for instance, of a glass provided with a conductive film and the electrochromic layer 2 is made of tungsten oxide. As electrolyte, one can use the sulfuric acid.

On the substratum 1 is applied a shield 6 made of a transparent and electrically insulating material, for instance made of $CaF_2$, $MgF_2$, $SiO$ or $SiO_2$. This shield 6 covers the marginal portions of the design or pattern constituted by the electrochromic layer 2, that is to say, when this pattern is constituted by segments as in the case of the numeral represented in FIG. 1, of each of these segments. This shield permits to prevent an excessive density of current on the edges of the electrochromic layer 2 and, consequently, an erosion of these edges. One has ascertained that the presence of this shield 6 permits to increase considerably the number of cycles, that is to say the duration of life of the display device.

What I claim is:

1. Electro-optical display device, especially for a timepiece or the like, comprising, superposed on each other, the following elements:
   a. a transparent conductive substratum,
   b. an electrochromic layer applied on the said substratum, the substratum and electrochromic layer constituting together a first electrode,
   c. a counter-electrode spaced from the said first electrode,
   d. an electrolyte carried in the space situated between the two electrodes,
   the said electrochromic layer constituting in plan view a design or pattern, and shield means made of transparent and electrically insulating material, said shield means being adhered to said substratum and covering the marginal portions only of said design or pattern for preventing an excessive density of current on the edges of the electrochromic layer and consequently thus preventing an erosion of these edges by said excessive density of current.

2. Display device as claimed in claim 1, characterised by the fact that the said shield means are made of $CaF_2$.

3. Display device as claimed in claim 1, characterised by the fact that the said shield means are made of $MgF_2$.

4. Display device as claimed in claim 1, characterised by the fact that the said means are made of $SiO$.

5. Display device as claimed in claim 1, characterised by the fact that the said shield means are made of $SiO_2$.

* * * * *